Patented Sept. 2, 1952

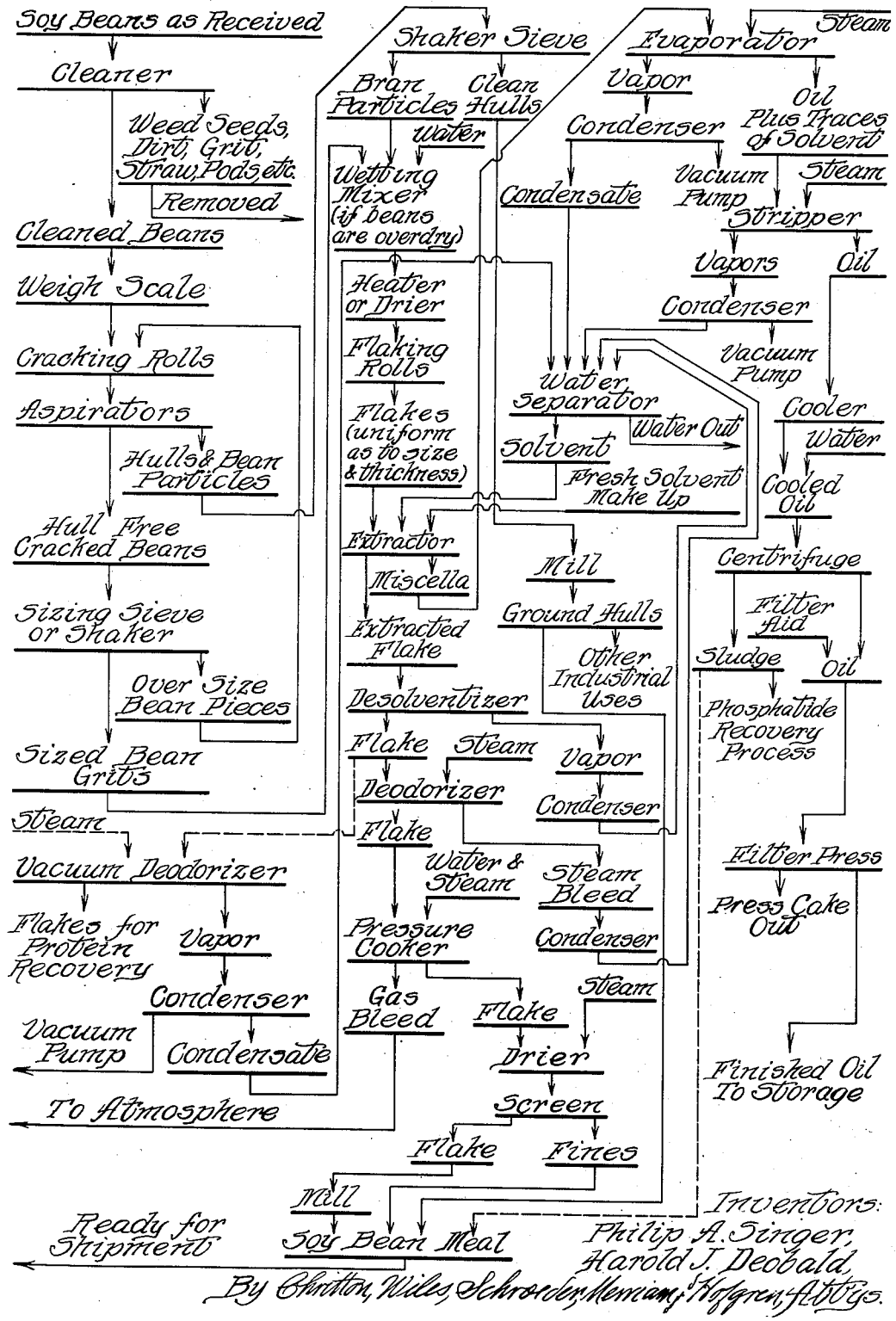

2,609,299

UNITED STATES PATENT OFFICE 2,609,299

TREATMENT OF SOYA BEANS

Philip A. Singer and Harold J. Deobald, Peoria, Ill., assignors to Allied Mills, Inc., a corporation of Indiana Application September 27, 1949, Serial No. 117,957

9 Claims. (Cl. 99—98)

This invention relates to the treatment of soy beans and more particularly to the preparation of soy beans for the solvent extraction of oil therefrom. This application is a continuation-in-part of our copending application Serial Number 574,674, filed January 26, 1945, now abandoned.

In general, methods now used for the processing of soy beans involve the steps of cracking, flaking, extracting which are followed by atmospheric distillation of the solvent from the oil and extracted flake. The flake is then (atmospherically) toasted and ground.

The methods commonly used are uneconomical for the most part due to inefficiencies in processing. In addition the quality of the finished products is generally either low or the methods used to improve the quality of the products are inefficient and lead to unduly high refining and solvent recovery costs. The present invention presents a new and improved method for the processing of soy beans for the extraction of oil and the economical treatment of the products of the extraction to obtain high quality finished products.

Certain of the steps used in this process are especially valuable because they result in extracted flakes which may be employed in a variety of ways to which flakes produced in conventional processes are not adapted. Thus, the market for the extracted flakes is broadened, and flexibility of operation enhanced.

Soy beans, as they are received by the processor, are often contaminated with weed seeds, dirt, grit, straw, bean pods and etc. If these materials are not carefully removed the lighter materials will interfere with the efficiency of extraction and cause a considerable lowering of the quality of the finished meal. In addition, these materials take up space in the extraction equipment, thereby reducing the over-all capacity of the extraction unit. Dirt and grit are not only inextractable but they work into the moving portions of the apparatus, such as are employed in the milling and flaking operation and the distillation equipment, causing excessive wear and erosion. Shaker screening and aspirating are both desirable to remove the objectionable contaminants from soy beans.

After thoroughly cleaning the beans the next step is cracking the beans as an antecedent to subsequent dehulling and flaking. This cracking operation is carried out in a series of metal cracking rolls, after which the cracked beans are dehulled, sized, corrected for moisture content when necessary and then heat tempered and flaked.

The next step is the dehulling of the cracked and sized grits. Hulls are dense cellulosic materials, substantially impervious to organic solvents and contain only .7 to 1% of fat. These hulls are not a material source of oil and may be regarded as a contaminant so far as the extraction process is concerned. When the hulls are removed the extraction capacity of the apparatus is immediately increased by 6 to 15% depending on the character of the beans to be extracted.

The removal of the hulls is carried out first by aspiration, then by screening the hulls on a shaker screen. Hulls blown from beans, as in the ordinary aspirator, contain enough bean particles to bring the fat content to 7 to 8%. By passing the hulls over a shaker screen, however, these fine particles may be economically removed, producing substantially pure hulls containing less than 1% of oil. Thus, without the loss of any oil the extraction capacity is increased by at least the extent of the hulls removed. The fine oily bean particles are mixed with the sized grits at the moisture conditioner where they agglomerate with them.

In conjunction with the aspiration to remove hulls the cracked beans are passed over shaker screens to assist in separation of the bean particles, or grits, and the hulls. This operation also is the first step in sorting the cracked beans to generally uniform size; and all the larger pieces, quarter and half beans, are returned to the cracking rolls for further size reduction. In a preferred sizing operation, all grits which will not pass through a six mesh screen are returned to the cracking rolls. The careful control of cracking avoids the production of unduly small particles, and those which are produced are classed as fines which are carried along with the sized grits and agglemorate with them at the moisture conditioner, as is true of the particles removed from the hulls. Only a few grits other than fines can pass through a ten mesh screen.

There are many disadvantages in flaking extra large pieces of beans in the presence of smaller pieces or grits. The larger pieces if sent through the flaking rolls tend to spread the rolls at the instant of passage producing a thicker flake from all grits at the instant of contact. Thus, the smaller grits passing through the rolls at the same time as larger pieces are not flaked to the same degree as when uniformly sized grits are flaked. The result is that the flakes are irregular in thickness and in area. Such non-uniform flakes will not extract efficiently because:
(1) The pentration of the solvent through the thicker flakes is delayed or incomplete;
(2) The flakes cannot be packed uniformly in the extraction apparatus, resulting in the channeling of the solvent;
(3) The capacity of the extractor is decreased since the lack of uniformity of the flake interferes with the uniform packing of the flakes, causing loose pockets in the flake mass; and
(4) The larger more dense (thicker) flake tends to protect the smaller flake against efficient solvent action.

The removal of the hulls also aids in obtaining a uniform flake since they too, in conjunction with oversize grits, cause a spreading of the flaking rolls thus producing flakes irregular as to size and thickness.

There are other advantages in hull removal which will become apparent as the subsequent steps of the invention are described.

The next step is the conditioning of the dehulled and sized grits for flaking, so as to produce flakes having sufficient strength to withstand the extraction process without breaking. Two factors, moisture content and temperature control, are of primary importance in producing a uniform thin flake of sufficiently high tensile strength for proper treatment.

The optimum flake thickness and size varies with different types of extractors, and it is the moisture and temperature conditioning which is the principal factor in assuring that the grits may be rolled to the desired thickness and size without losing resiliency and other desirable characteristics.

We prefer to use the Hansa-Muhle, or "paternoster" type extractor, and accordingly will here describe what we have found to be the desirable moisture and temperature conditions to produce a flake suitable for that extractor. The grits must be conditioned to contain not less than 10.5% and not more than 12% of moisture, and the moisture must be uniformly distributed throughout each grit particle. If the moisture content of the grits is too low, the proper conditions for forming a thin resilient flake are not attained and the cell structure, lacking the proper turgidity, is not sufficiently disintegrated for proper extraction of the oil. On the other hand, if the moisture content is too high, the oil in the flake becomes partially emulsified producing a condition which impedes the extraction of the oil.

The second factor is temperature control. The exact temperature for heat treatment should be predetermined for each batch of soy beans, since beans of various crop years, varieties and growing conditions have different characteristics in this respect. In general, beans having a high oil content require less temperature for flaking than those of low oil content. The temperature is usually held between 150° and 175° F.

The moisture content of the grits may be adjusted and a uniform distribution of the moisture is attained, together with the required temperature control, by means of two processing chambers arranged in series. The first is a tempering chamber where water is added to the grits if they are too dry. This chamber is by-passed when the grits have a moisture content above 10.5%. The second chamber is a combination heating and drying unit where the beans are heated to the required temperature and dried to a desired moisture content if this is too high. This chamber is in addition so designed that a stream of air may be passed concurrently over the heated grits to carry off any excess moisture. The capacities of both of these units are sufficient to allow for complete moisture and temperature equilibrium throughout the mass and also within the grit particles. A mere surface addition of moisture to the cracked beans going to the flaking rolls, which is common practice, is undesirable for the reason that flakes of uniform thickness cannot be produced. The conditioned grits which have been previously cleaned, sized, dehulled and heated are then flaked on conventional cold steel rolls. The chambers and their arrangement are, however, not part of the present invention. The moistening and heating of the beans may be carried out in any suitable fashion.

The clean flakes ready for extraction are of substantially uniform size and thickness because of the dehulling and sizing of the grits prior to flaking, and are of the desired physical characteristics principally due to the moisture and temperature conditioning. As previously pointed out, there are several types of extractors, of both the continuous and "batch" types, and any one may be used for extraction provided the flakes have been suitably prepared for the particular type.

In the Hansa-Muhle, or "paternoster" type extractor which we prefer, the flakes are loaded into baskets having perforated bottoms, and are and are there leached with the solvent as they are carried on an endless chain inside a gas-tight shell. After the extraction is completed the baskets are dumped into a closed conveyor which removes the flakes from the extraction unit. The solvent and extracted materials "miscella" are drawn off at the bottom of the shell. The number of baskets, the size of the baskets and the time of contact with the solvent are all determined by the desired capacity of the extraction unit and by the required efficiency of extraction. To illustrate: if a given plant unit will produce 100 tons of extracted flake of 0.5 to 0.7% of oil per 24 hour period this same plant could produce 130 tons if the allowable oil content of the flake were increased to 1.0 to 1.2%.

If the hulls are allowed to remain with the flakes in the extractor the impervious nature of these large coarse hulls interferes with the uniform passage of the solvent through the flakes, causing the solvent to channel, or by-pass flakes immediately below the hulls. Thus, the removal of hulls not only increases the overall capacity of the extraction system but in addition increases the efficiency of the solvent extraction as well.

Removal of the hulls, which have a low protein content, also leaves a meal of higher quality by virtue of the elimination of this fibrous poor quality material. Protein content is thus increased and the crude fiber decreased by the extent of the hull removal. For many feed and food uses this higher quality product is very desirable as for food preparations, and poultry and hog feeds.

Hull free material is also advantageous for the production of pure industrial protein preparations. Great advances have recently been made in the extraction of relatively pure soy bean proteins for use as sizes, adhesives, adjuncts to flour and the production of wool-like fibers. The dehulling makes possible a more pure raw material for the production of these products having a higher concentration of protein by the substantial elimination of an interfering contaminant. Hulls are particularly detrimental in the extraction of pure soy proteins in that they partially decompose in the process yielding soluble degradation products which interfere with the recovery and purification of the finished product.

The solvent is removed from the "miscella" (solvent plus extractives) at low temperatures and in as short a time as possible. The solvent recovery system is therefore operated at below atmospheric pressure and the equipment is so designed that a minimum amount of "miscella" is processed at any one time. This is done so that the oil is exposed to a minimum of heat treatment. The last traces of solvent are removed by passing steam at reduced pressure over the oil which has been spread to a film by any of several accepted methods for extending the exposed surfaces of oils. Apparatus for such process is well known and is not part of this invention.

The resulting desolventized oil is lighter colored and much more susceptible to refining processes than that where the solvent is removed under atmospheric pressure or even above atmospheric pressure as is sometimes done.

The oil, free from solvent, still contains dissolved impurities such as phosphatides, sterols, saponins, gums and mucilagenous materials. These are substantially removed by means of warm water or steam either continuously or in a batch system. The amount of water or steam used and the speed and extent of agitation used are determined by the character of the oil. Commercial soy beans may vary considerably in the nature of their oil content. Steam or warm water is injected into the oil in this process, with violent agitation, and finally the separation of the coagulated impurities by centrifuging. These impurities so removed may be further processed for the recovery of phosphatides in flake form according to a method outlined in patent application No. 494,116, now abandoned.

After removal of the bulk of impurities, it is desirable to filter press the oil with diatomaceous earth for clarification and to remove any surplus moisture.

The extracted flake leaving the extractor is, of course, saturated with solvent. In former methods this material was passed through several desolventizing drums or conveyors, usually two sets of four in series, followed by a deodorizing drum and finally through a toaster, a total of ten units.

By means of the present invention this multiplicity of apparatus may be eliminated. This may be accomplished by circulating superheated vapors, such as those of hexane, repeatedly over and/or through the extracted flakes so that all but the last traces of solvent are removed. The material is next deodorized by blowing steam through the flakes with bleeding off of the steam to produce a product free from the last traces of solvent and for the removal of constituents which impart a bitter or brany taste to the beans and flakes. The flakes are then either moistened or passed directly to the final treatment, depending upon the use for which the flakes are intended. The desolventizing process here described is described in more detail and claimed in co-pending application of Philip A. Singer, Serial Number 20,833, filed April 13, 1948, now abandoned, in favor of a continuation-in-part, Ser. No. 225,687 filed May 11, 1951, and the apparatus for carrying out the process is described in copending application of Philip A. Singer, Serial Number 20,715 filed April 13, 1948.

If it is desired to produce a product of highest nutritional value, the flakes delivered by the deodorizer are heated under a steam pressure of 10 to 20 pounds for 15 to 30 minutes to "toast" them. The exact pressure and time of processing varies with the character of the beans. In any event, it is carried on for sufficient time, with bleeding off of the steam, to produce a product of the highest possible nutritional efficiency. Bleeding off of the steam is done in this instance to rid the pressure vessel of generated gases and liberated air which if allowed to remain in the vessel would cause faulty pressure readings and irregular treatment of the flakes.

If, however, the flake is to be used for the industrial extraction of protein, heat denaturation is to be avoided. The treatment is then carried out under a vacuum and at as low a temperature as practicable. This low temperature treatment increases the relative ease and degree of protein solubility.

In some cases high quality hull-free flakes may not be desired as in cattle and sheep feeds. In such instances, the hulls, after removal, may be advantageously preground before reincorporating them into the flake. For certain uses it is desirable to toast the ground hulls, in which case they are mixed with the flakes before the final toasting step described above. Removal of hulls before extraction thus gives great flexibility in producing a wide variety of end products. Thus, for example, the extracted flakes may be ground to meal without reincorporation of hulls to produce a high-grade meal; or may be converted to a cheaper, lower quality animal feed by reincorporating the ground hulls.

In the drawings a diagrammatic flow sheet of the process herein described is set forth purely for the sake of convenience in understanding the operation.

The foregoing detailed description has been given for clearness of understanding only, and no unnecessary limitations should be understood therefrom.

We claim:

1. The method of preparing clean soy beans for solvent extraction of oil which comprises cracking the beans to form grits, separating the hulls from the grits, sorting the grits by size and returning all grits larger than a predetermined size for further cracking, adjusting the moisture content and temperature of the sized grits to permit rolling of the grits into substantially flat flakes of high tensile strength and resistance to breakage in a solvent extraction process, and then rolling the grits into flakes of substantially uniform size and thickness.

2. The method of claim 1 wherein the grits larger than about one-quarter bean are returned for further cracking.

3. The method of claim 1 which includes the steps of removing all fine oily bean material from the separated hulls and mixing it with the sized grits not later than the moisture adjustment step.

4. The method of preparing clean soy beans for solvent extraction of oil which comprises cracking the beans to form grits of generally uniform size, removing all fine oily bean material from the separated hulls and mixing said material with the grits to form a composite mass, adjusting the moisture content and temperature of the mass to agglomerate the fine material with the grits and to permit rolling the grits into substantially flat flakes of high tensile strength and resistance to breakage in a solvent extraction process, and then rolling the grits into flakes of substantially uniform size and thickness.

5. The method of preparing clean soy beans for solvent extraction of oil which comprises cracking the beans to form grits of generally uniform size, separating the hulls from the grits, sorting the grits by size and returning all grits larger than a predetermined size for further cracking, tempering the sized grits to a moisture content of 10.5% to 12% by weight and a temperature of 150° to 175° F., and then rolling the grits into flakes of substantially uniform size and thickness.

6. The method of treating clean soy beans which comprises cracking the beans to form grits, separating the hulls from the grits, sorting the grits by size and returning all grits larger than a predetermined size for further cracking, removing all fine oily bean material from the separated hulls and mixing it with the sized grits to form a mass, adjusting the moisture content and temperature of the mass to permit rolling thereof into substantially flat flakes of high tensile strength and resistance to breakage in a solvent extraction process, then rolling the mass into flakes of substantially uniform size and thickness, and subjecting the flakes to a solvent extraction process.

7. The method of treating clean soy beans which comprises cracking the beans to form grits of generally uniform size, separating the hulls from the grits, sorting the grits by size and returning all grits larger than a predetermined size for further cracking, tempering the sized grits to a moisture content of 10.5% to 12% by weight and a temperature of 150° to 175° F., then rolling the grits into flakes of substantially uniform size and thickness, and subjecting the flakes to a continuous solvent extraction process.

8. The method of claim 7 wherein all fine oily bean material is removed from the separated hulls and mixed with the grits not later than the moisture tempering step.

9. The method of treating clean soy beans which comprises cracking the beans to form grits, separating the hulls from the grits, removing all fine oily bean material from the hulls and mixing it with the grits, adjusting the moisture content and temperature of the grits to permit rolling of the grits into substantially flat flakes of high tensile strength and resistance to breakage in a solvent extraction process, and rolling the grits into flakes.

PHILIP A. SINGER.
HAROLD J. DEOBALD.

REFERENCES CITED

The following references are of record in the file of this patent:

UNITED STATES PATENTS

| Number | Name | Date |
|---|---|---|
| 1,867,541 | Shellabarger | July 12, 1932 |

OTHER REFERENCES

Markley: Soybean Chemistry & Tech., page 166, Chem. Pub. Co., 1944.

Satow: Researches on Oil & Proteid Extraction From Soy-bean, 1921, pages 17, 22, and 25.

Horvath: Soybean Ind. 1938, pages 54, 55, 56, and 69.

King: Trans. Am. Inst. of Chem. Eng., vol. 40, 1944, pages 533–535 and 542.